March 31, 1931.   R. F. PEO   1,798,352
SHOCK ABSORBER
Filed Aug. 30, 1929   2 Sheets-Sheet 2

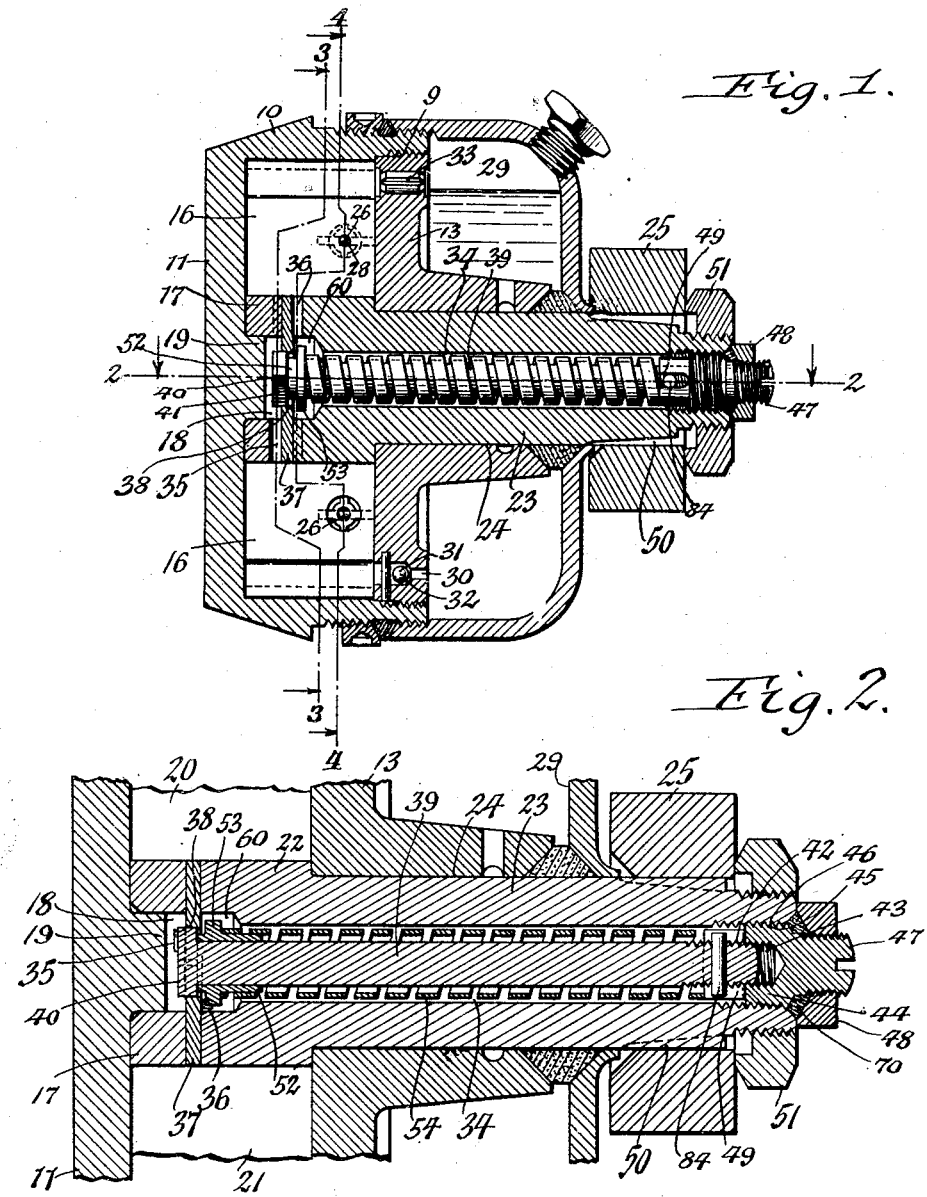

Inventor
Ralph F. Peo
By Popp & Powers
Attorney

Patented Mar. 31, 1931

1,798,352

UNITED STATES PATENT OFFICE

RALPH F. PEO, OF KENMORE, NEW YORK, ASSIGNOR TO HOUDE ENGINEERING CORPORATION, OF BUFFALO, NEW YORK, A CORPORATION OF NEW YORK

SHOCK ABSORBER

Application filed August 30, 1929. Serial No. 389,360.

This invention relates to a hydraulic shock absorber of the type shown in the Houdaille Patent, No. 1,627,810 which is more particularly intended for cushioning the shocks while running an automobile although the same may also be employed advantageously in other installations.

One of the objects of this invention is to provide such shock absorbers with simple, reliable and efficient means whereby a definite predetermined resistance is offered to the passage of the resistance liquid from the high pressure side of the pistons to the low pressure sides of the same, during their high pressure strokes in the working chambers which resistance, however, will yield when an abnormally high pressure is developed in operating the instrument, such for example, as a reduction in fluidity of the resistance liquid in winter time or cold weather, and thereby permit the absorber to operate with a substantially uniform cushioning effect during varying temperature conditions.

Another object of this invention is to so construct the liquid resistance regulating mechanism that the same can be readily adjusted to suit different loads.

Another object of the invention is to so organize the mechanism that the same is not liable to be injured in case the length of the valve stem should lengthen due to increase in temperature or if the hydraulic pressure against the regulating valve closure is abnormally high.

In the accompanying drawings:

Fig. 1 is a longitudinal section of a hydraulic shock absorber, embodying an approved form of this invention.

Fig. 2 is a similar view, on an enlarged scale, of the resistance liquid regulating mechanism, taken on line 2—2, Fig. 1.

In the following description similar characters of reference indicate like parts in the several figures of the drawings.

Figure 3:
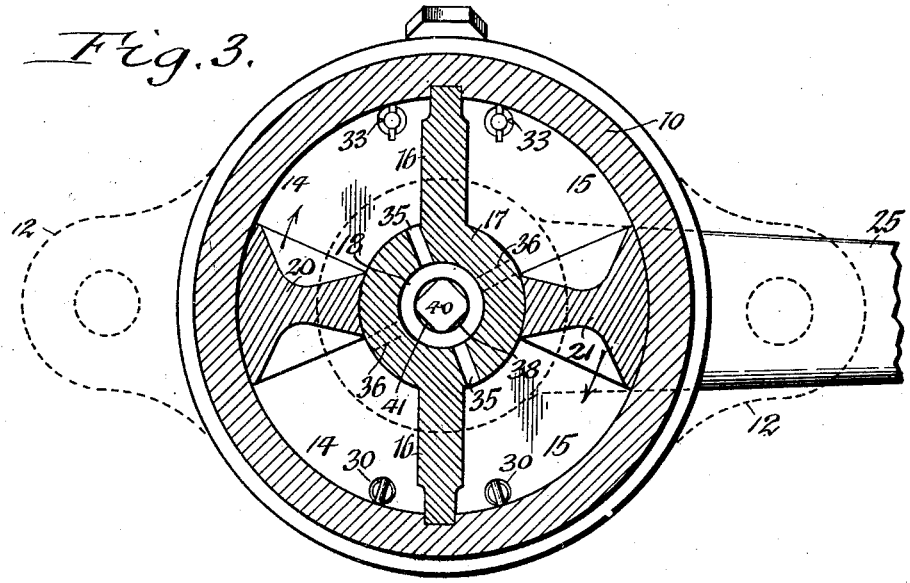
Figs. 3 and 4 are cross sections taken on the correspondingly numbered lines in Fig. 1, and looking from the rear toward the front of the instrument.
Figure 4:
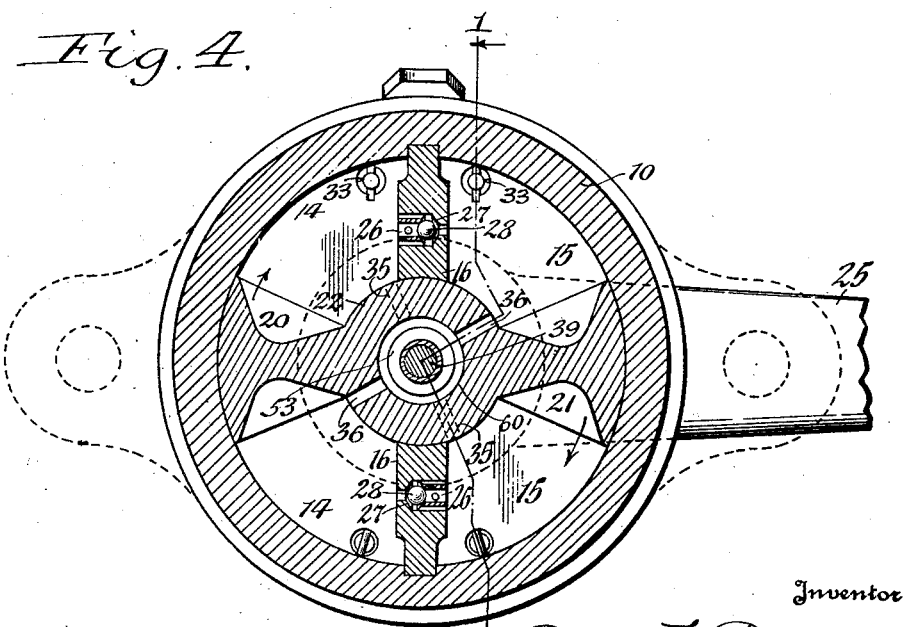

This shock absorber is provided with a hollow cylindrical body consisting preferably of a cylindrical peripheral wall 10, a rear head or wall 11 formed integrally with the peripheral wall at the rear end thereof and provided with lugs 12 adapted to be connected with one of two relatively movable parts such as the frame of an automobile, and a front wall 13 connected at its edge with the front end of the peripheral wall by a screw joint 9.

The interior of this cylindrical body is divided into two segmental working chambers 14, 15 by a sectional partition having its sections 16, 16 arranged diametrically within the outer or peripheral part of the body and their inner or bore ends connected by a circular collar 17 formed integrally therewith. The latter is provided centrally with an axial opening 18, the rear part of which receives a centering or pilot pin 19 projecting forwardly from the rear wall 11 of the body while the front part of this opening is vacant to form part of a liquid by-pass between the working chambers as will presently appear.

Two working pistons or wings 20, 21 oscillate within these working chambers, the inner ends of these pistons being connected by a circular hub 22 which is formed integrally therewith and which engages its periphery with the inner edges of the partition sections 16 while its front end engages with the inner or rear side of the front body wall 13, as shown in Fig. 1. The hub 22 is formed on the rear or inner end of an operating rock shaft 23 which is journaled in a bearing 24 on the central part of the wall 13 and has its external front end connected with an operating rock arm 25 which is connected with the other relatively movable part, such for example as the axle of an automobile upon which the frame of the car is mounted by means of a spring system. This arm is compelled to turn with the shaft by serrations 50 and held against forward movement thereon by a clamping screw nut 51 applied to the front end of the operating shaft, as shown in Fig. 1.

The working chambers of the body are filled with a resistance liquid, such as oil, and during the low pressure strokes of the pistons this liquid is permitted to pass with comparative freedom from the low pressure end of each working chamber to the high pressure end of the companion chamber by a check valve controlled passage consisting preferably of a port 26 arranged in each partition section and provided with a valve seat 27 facing the high pressure end of the respective chamber, and a ball check closure 28 movable toward and from this valve seat.

In front of the body is arranged a replenishing chamber or reservoir 29 which is adapted to contain a reserve supply of resistance liquid and from the lower end of which this liquid is delivered to the lower ends of the working chambers through one or more replenishing ports 30 in the lower part of the wall 13, and each controlled by a check valve closure 31 which is arranged in the respective port 30 and movable toward and from a valve seat 32 therein which faces the respective working chamber, as shown in Fig. 1. Air is permitted to escape from the upper ends of the working chambers into the upper end of the replenishing chamber by vents 33 arranged in the wall 13 at the upper ends of these chambers.

For the purpose of regulating the cushioning effect of the resistance liquid in the shock absorber in accordance with the load imposed on the same and other variable conditions, valve controlled by-pass means are provided which permit the resistance liquid to flow back and forth between the several ends of the working chambers independently of the check valves in the partition sections which by-pass valve means are constructed as follows:

The numeral 34 represents a longitudinal bore formed in the shaft and hub of the pistons and having its inner or rear end enlarged to form a circular valve chamber 60 which is arranged opposite the pocket or recess formed by the front end of the opening 18 in the collar 17 forming an integral part of the partitions 16. On its front face the collar 17 is provided with two radial grooves 35, 35 extending radially from its central opening 18 to the periphery of this collar adjacent to the high pressure sides of the respective partition sections, and connecting with the high pressure ends of the working chambers, and on the rear face of the piston hub at a distance from the grooves 35, 35 are formed two grooves 36, 36 extending radially from the central valve chamber 60 to the periphery of the hub adjacent to the low pressure sides of the pistons.

The numeral 37 represents a valve seat disk which is arranged between the collar 17 of the partition sections and the hub 22 of the pistons and bears with its peripheral edge against the inner edges of the partition sections while its front side bears against the rear end of said hub and its rear side bears against the front side of said collar. In its central part the disk is provided with a circular valve port 38 which connects the opening 18 in the collar 17 with the valve chamber 60 in the hub. In this manner the disk cooperates with the collar and hub to form intercommunicating passages or by-passes between the high and low pressure ends of the working chambers on opposite sides of the partition sections, and the pistons through which the resistance liquid can pass back and forth in regulated or metered quantity during both the low and high pressure strokes of the pistons, and thus prevents the formation of solid liquid resistance at any time but instead offers a yielding resistance whereby shock is absorbed in accordance with the intensity of the same.

For the purpose of regulating or metering the flow of the resistance liquid through the by-passes from one side of the pistons to the other to suit different loads or conditions, means are provided for adjusting the capacity of the by-passes which embody the present invention and which in their preferred form are constructed as follows:

The numeral 39 represents a longitudinally adjustable valve stem arranged lengthwise in the hollow rock shaft 23 and hub 22 and provided at its inner end with an enlarged guide head 40 which slides in the port 38 of the valve disk 37 but permits liquid to pass back and forth through the port 38 by providing the periphery of the guide head with flattened faces 41 so that the same does not wholly obstruct the port 38, as shown in Fig. 3.

At its outer or front end the valve stem 39 is provided with an external screw thread 42 which engages with an internally threaded longitudinal bore 43 of an adjusting head 44. The latter is provided on its central part with an external screw thread 45 which engages with an internal screw thread 46 in the outer end of the bore of the operating shaft and also with an externally threaded reduced neck 47 which projects forwardly and receives a clamping and packing screw nut 48 between the inner or rear side of which and the front or outer end of the operating shaft a packing 70 is compressed for the purpose of preventing leakage of liquid from the interior of the operating shaft to the exterior of the same and also to hold the adjusting head normally against turning.

Means are provided for positively locking the valve stem and outer adjusting head 44 against turning relatively to one another which means preferably consist of a transverse pin 84 passing transversely through the front end of the valve stem and having its opposite ends arranged in longitudinal slots 49 formed in the inner end of the adjusting head 44, as shown in Figs. 1 and 2.

Slidable lengthwise on the inner end of the valve stem is a valve sleeve 52 which is provided with an annular flange or rim 53 forming a valve closure which is movable toward and from the front side of the disk 37 and thereby varies the capacity of the by-passes which include the passages 35, 36; the chambers 18, 60 and the port 38. This valve closure is limited in its rearward movement of the valve stem by engagement of the inner or rear end of the valve sleeve 52 with the front side of the guide head 40 and this sleeve and the valve closure formed integrally therewith are yieldingly held in their rearmost position on the valve stem by a helical spring 54 surrounding the valve stem and bearing at its rear end against the valve closure 53 and at its front end against the adjusting head 44.

When setting the instrument for use on an automobile the adjusting head 44 is screwed on the valve stem so that the valve closure is held against the guide head 40 with a predetermined pressure by the spring 54, and the valve closure is adjusted by screwing the adjusting head on the valve stem so that the closure normally occupies a definite position relative to the front side of the valve disk 37, and provides a liquid passage of predetermined capacity between the front side of the disk 37 and the rear side of the valve closure 53.

As the shaft is rocked backwardly during the compression of the automobile springs upon striking an obstruction or uneven place on the road the pistons 20, 21 move backwardly or toward the low pressure ends of the working chambers during which time some of the resistance liquid passes directly from the low pressure ends of the working chambers through the check valve ports 26 in the partitions 16 due to the check valves 28 opening automatically at this time and some of the resistance liquid also passes indirectly from the low pressure ends of the working chambers successively through the passages 36, valve chamber 60, port 38, opening 18 and passages 37 to the high pressure ends of the working chambers, thereby producing a comparatively mild shock resisting effect upon the load to which the car is subjected.

During rebound of the springs of the automobile the pistons of the shock absorber move forwardly from the low pressure ends toward the high pressure ends of the working chambers and at this time no resistance liquid can flow through the partitions 16 because the check valves 28 are closed and liquid can only escape indirectly from the high pressure to the low pressure ends of the working chambers by passing successively through the passages 35, opening 18, port 38, chamber 60 and passages 36, thereby offering a greater resistance to the flow of the resistance liquid and increasing the shock absorbing effect accordingly.

When an unusually severe shock is encountered whereby the pistons are moved more suddenly from the low pressure to the high pressure ends of the working chambers, then an increase in pressure on the resistance would ensue but at such times the spring 54 would yield more or less to such increase pressure and permit the valve closure 53 to move away from the seat or face on the front side of the valve disk 37 and thereby permit the liquid to flow more freely and thus relieve the excess pressure and cause the shock to be absorbed gradually. In like manner the valve closure 53 will be opened automatically to a greater extent and permit the liquid to flow more freely from the high pressure to the low pressure sides of the pistons in the event that the liquid becomes thicker in cold weather, an increases the pressure during the forward or spring rebound strokes of the pistons, thereby insuring uniformity of operation of the absorber under varying temperature conditions.

If the valve stem should be expanded due to increase in temperature the inner guide head on the rear end of the same will simply slide in the port of the valve disk without any possibility of the valve stem being buckled at this time, and such expansion will also permit the valve closure 53 to engage the front side of the disk 37 and to be arrested thereby while the valve stem continues to extend itself rearwardly under increasing temperature without injurying any of the parts.

The valve closure together with the spring resistance may also be adjusted as a unit for increasing or decreasing the gap between the valve disk seat and the face of the valve closure to suit the load which is to be carried by the absorber and other varying conditions. During such unitary adjustment of the valve stem, valve closure and its spring, the tension of the latter is not changed inasmuch as the adjusting head 44 when screwed inwardly or outwardly on the rock shaft merely moves the valve closure 53 toward or away from the valve seat on the disk 37 without changing the distance between the valve closure 53 and the adjusting head 44 against which the opposite ends of the spring 54 bear.

If, however, it is desired to increase or decrease the resistance effect of the spring 54 this can be done by removing the valve stem, together with the spring, valve closure and adjusting head thereon, from the rock shaft, then driving out the key or locking pin 48 from the valve stem, then screwing the adjusting head 44 inwardly or outwardly on the valve stem until the spring has the desired tension, then restoring the locking pin, and then replacing the entire valve adjusting unit in the rock shaft.

By this means the spring may be mounted in the factory under an initial set which virtually requires no change excepting under unusual conditions, but the valve adjusting unit can be readily adjusted while the absorber is on a car, thereby avoiding the necessity of dismounting any parts for this purpose and permitting of easily adapting the absorber to the load which is to be carried by the car on which the absorber is mounted.

If the valve stem should be made of a material having a higher coefficient of expansion, due to heat, than the rock shaft, then the valve stem and the ported valve disk can be so adjusted that a proportioned change in the capacity of the gap between the valve closure and the seat of the valve disk will be effected which is proportionate to the change of temperature of the instrument and thereby insure uniform operation of the instrument under varying temperatures.

In other words, it is possible to definitely regulate this instrument by means of a screw and pin and slot connection between the adjusting head and the shaft and valve stem so that the spring will have a definite strength, which strength will be maintained during all ordinary temperature conditions, but which will only be relieved in the event of unusual pressures, in which case the spring will be compressed and permit of unloading the excess pressure.

It will therefore be apparent that this obsorber provides means which safeguard the same against breakage or derangement in case the same should be loaded abnormally high and that the absorber can be readily adjusted to suit different loads and conditions and operate satisfactorily under variations in temperature.

I claim as my invention:

1. A hydraulic shock absorber adapted to be interposed between two relatively movable members, comprising a casing adapted to be connected with one of said members and having a working chamber adapted to contain a resistance liquid, a piston movable back and forth in said chamber and adapted to be connected with the other member, a passage extending from one end of said chamber to the other and having a port, and means for regulating the flow of liquid through said passage including a closure arranged in said passage, a spring resistance operating to move said closure toward and from said port, means for mounting said closure and spring resistance as a unit which can be adjusted bodily toward and from said port without changing the tension of said spring resistance, and means forming part of said unit for varying the tension of said spring resistance.

2. A hydraulic shock absorber adapted to be interposed between two relatively movable members, comprising a body adapted to be connected with one of said members and having a working chamber adapted to contain a resistance liquid, a piston movable back and forth in said chamber and adapted to be connected with the other member, a passage connecting opposite ends of said chamber and having a port, and means for controlling the flow of liquid through said passage including a valve stem, a valve closure movable toward and from said port and slidable on the inner end of said stem, means for limiting the movement of said closure on said stem toward said port, a head adjustable lengthwise on the outer end of said stem, and a spring interposed between said closure and head.

3. A hydraulic shock absorber adapted to be interposed between two relatively movable members, comprising a body adapted to be connected with one of said members and having a working chamber adapted to contain a resistance liquid, a piston movable back and forth in said chamber and adapted to be connected with the other member, a passage connecting opposite ends of said chamber and having a port, and means for controlling the flow of liquid through said passage including a valve stem, a valve closure movable toward and from said port and slidable on the inner end of said stem, means for limiting the movement of said closure on said stem toward said port, a head having a screw connection with the outer end of said stem and provided with a slot, a pin on said stem engaging with said slot, and a spring surrounding said stem and engaging its inner and outer ends with said closure and head, respectively.

4. A hydraulic shock absorber adapted to be interposed between two relatively movable members, comprising a body adapted to be connected with one of said members and having a working chamber adapted to contain a resistance liquid, a piston movable back and forth in said chamber and adapted to be connected with the other member, a passage connecting opposite ends of said chamber and having a port, and means for controlling the flow of liquid through said passage including a valve stem having a guide head at its inner end which is arranged in said port and which has parts of the periphery cut away, a valve sleeve slidable on the inner end of said stem and adapted to engage said guide head for limiting the inward movement of said sleeve on the stem and provided with an annular valve closure which is movable toward and from said port for varying the capacity of said passage, an adjusting head mounted on the outer end of said stem and capable of longitudinal adjustment thereon, and a spring interposed between said valve closure and said adjusting sleeve.

5. A hydraulic shock absorber adapted to be interposed between two relatively movable members, comprising a body adapted to be connected with one of said members and having a working chamber adapted to contain a resistance liquid, a piston movable back and forth in said chamber and adapted to be connected with the other member, a passage connecting opposite ends of said chamber and having a port, and means for controlling the flow of liquid through said passage including a valve stem having a guide head at its inner end which is arranged in said port and which has parts of the periphery cut away, a valve sleeve slidable on the inner end of said stem and adapted to engage said guide head for limiting the inward movement of said sleeve on the stem and provided with an annular valve closure which is movable toward and from said port for varying the capacity of said passage, a tubular support in which said stem is arranged, an adjusting head having screw connections with the outer ends of said stem and support, and a spring interposed between said closure and adjusting head.

6. A hydraulic shock absorber adapted to be interposed between two relatively movable members, comprising a body adapted to be connected with one of said members and having a working chamber adapted to contain a resistance liquid, a piston movable back and forth in said chamber and adapted to be connected with the other member, a passage connecting opposite ends of said chamber and having a port, and means for controlling the flow of liquid through said passage including a valve stem having a guide head at its inner end which is arranged in said port and which has parts of the periphery cut away, a valve sleeve slidable on the inner end of said stem and adapted to engage said guide head for limiting the inward movement of said sleeve on the stem and provided with an annular valve closure which is movable toward and from said port for varying the capacity of said passage, a tubular support in which said stem is arranged, an adjusting head having screw connections with the outer ends of said stem and support, a spring interposed between said closure and adjusting head, and threaded neck projecting forwardly from said adjusting head, a screw nut arranged on said neck, and a packing arranged between said head, neck, support and nut.

7. A hydraulic shock absorber adapted to be interposed between two relatively movable members, comprising a body adapted to be connected with one of said members and having a circular working chamber adapted to receive a resistance liquid and a bearing on a wall of said chamber, a piston movable back and forth in said chamber and having a hub and a shaft journaled in said bearing, said shaft having a longitudinal bore, said hub having a valve chamber communicating with said bore, and said hub and body being provided with a passage which connects opposite ends of said working chamber and which has a port opening into said valve chamber, a valve stem arranged within said hub and shaft and provided at its inner end with a guide head arranged in said port, a valve sleeve slidable on the inner end of said stem and adapted to engage said guide head and provided with an annular valve closure which is arranged opposite said port, an adjusting head adjustable lengthwise on the outer end of said stem, and a spring interposed between said valve closure and said adjusting head.

8. A hydraulic shock absorber adapted to be interposed between two relatively movable members, comprising a body adapted to be connected with one of said members and having a circular working chamber adapted to receive a resistance liquid and a bearing on a wall of said chamber, a piston movable back and forth in said chamber and having a hub and a shaft journaled in said bearing, said shaft having a longitudinal bore, said hub having a valve chamber communicating with said bore, and said hub and body being provided with a passage which connects opposite ends of said working chamber and which has a port opening into said valve chamber, a valve stem arranged within said hub and shaft and provided at its inner end with a guide head arranged in said port, a valve sleeve slidable on the inner end of said stem and adapted to engage said guide head and provided with an annular valve closure which is arranged opposite said port, an adjusting head having a screw connection with the outer end of said stem and a screw connection with the outer end of said shaft and provided on its inner end with a longitudinal slot, a pin arranged on said stem and projecting into said slot, and a spring surrounding said stem and engaging its opposite ends with said closure and adjusting head.

9. A hydraulic shock absorber adapted to be interposed between two relatively movable members, comprising a body adapted to be connected with one of said members and having a circular working chamber adapted to receive a resistance liquid and a bearing on a wall of said chamber, a piston movable back and forth in said chamber and having a hub and a shaft journaled in said bearing, said shaft having a longitudinal bore, said hub having a valve chamber communicating with said bore, and said hub and body being provided with a passage which connects opposite ends of said working chamber and which has a port opening into said valve chamber, a valve stem arranged within said hub and shaft and provided at its inner end with a guide head arranged in said port, a valve sleeve slidable on the inner end of said stem and adapted to engage said guide head and provided with an annular valve closure which is arranged opposite said port, an adjusting head having a screw connection with the outer end of said item and a screw connection with the outer end of said shaft and provided on its inner end with a longitudinal slot, and on its outer end with a threaded neck, a pin arranged on said stem and projecting into said slot, a spring surrounding said stem and engaging its opposite ends with said closure and said adjusting head, a screw nut arranged on said neck, and a packing surrounding said adjusting head and neck and interposed between said nut and the outer end of said shaft.

In testimony whereof I hereby affix my signature.

RALPH F. PEO.